April 29, 1958     O. J. SULLENBERGER     2,832,138
INSTRUMENT FOR LAYOUT OF GEOMETRICAL DESIGN
Filed Sept. 28, 1955

Otto J. Sullenberger
INVENTOR.

BY *Clarence A. O'Brien*
*and Harvey B. Jacobson*
Attorneys

United States Patent Office 2,832,138
Patented Apr. 29, 1958

2,832,138

INSTRUMENT FOR LAYOUT OF GEOMETRICAL DESIGN

Otto J. Sullenberger, Waco, Tex.

Application September 28, 1955, Serial No. 537,199

1 Claim. (Cl. 33—1)

This invention generally relates to an instrument for laying out various geometrical designs and more specifically provides an instrument including in its construction a circle disposed on a flat sheet of material having a graduation scale thereon together with a rotatable pointer arm wherein the pointer arm may be employed for securing design templates within the circle and for attachment of a guide string or straight edge wherein various significant points and marks may be made as a result of positioning of the pointer arm in relation to the design template positioned within the circle of the device of the present invention.

An object of the present invention is to provide an instrument for the layout of geometrical designs which is especially beneficial in various utilities such as landscaping gardens for providing flower plantings in a particular design.

Another important object of the present invention is to provide an instrument for the layout of geometrical designs which is simple in construction, easy to use, adaptable for various purposes, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
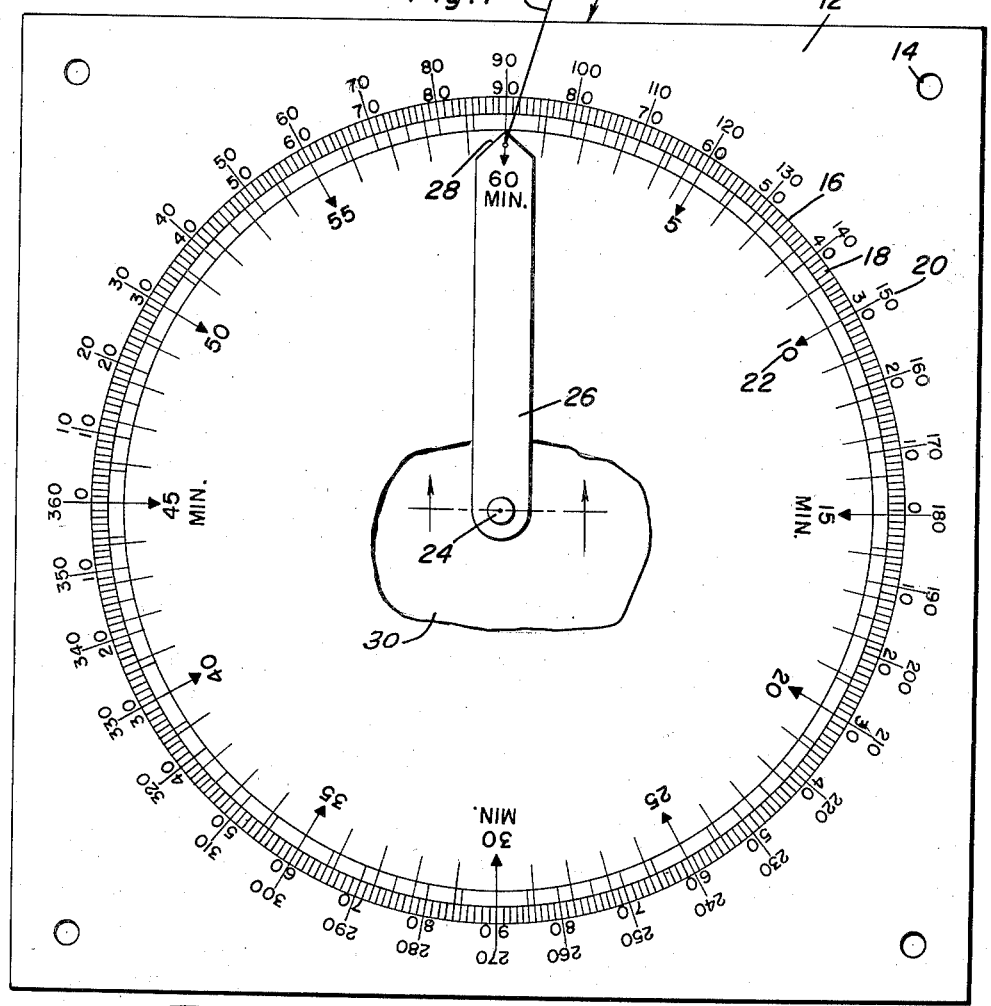
Figure 1 is a plan view of the plate member forming the basic portion of the present invention.

Referring now specifically to the drawing, the numeral 10 generally designates the instrument of the present invention which includes a generally square plate or sheet of material designated by the numeral 12 having apertures 14 adjacent each corner thereof wherein suitable securing devices in the form of fasteners may be inserted therethrough for mounting the plate 12 on a suitable supporting surface. A plurality of concentric circles 16 are disposed on the upper surface of the plate 12 and include graduation lines 18 extending therebetween together with degree numerical indicia 20 exteriorly of the circles 16 and minute numerical indicia 22 interiorly of the circles 18. The plurality of circles 18 and the particular layout of the graduation lines permit the easy reading thereof and the numerical indicia 20 begins at a base point and proceeds in both directions around the circle and the minute indicia 22 simulates the markings on the face of the clock.

Figure 2:
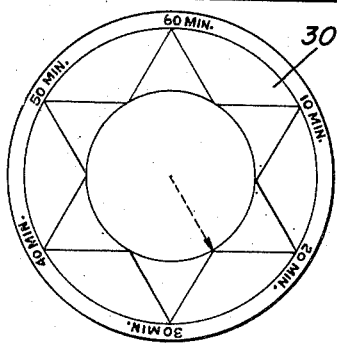
Figure 2 is a plan view of one form of template to be employed with the plate of Figure 1.
Figure 3:
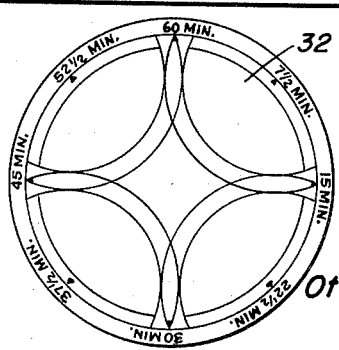
Figure 3 is a plan view of another form of template which may be employed with the construction of Figure 1.
Figure 4:
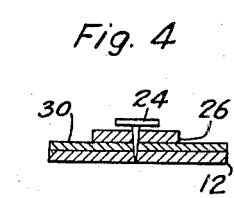
Figure 4 is a sectional view taken on the line 4—4 of Figure 1.

The center of the area defined by the circle 16 is provided with a suitable aperture for receiving a depending pin 24 of an indicating arm 26 having a pointed outer end 28 which terminates at the innermost circle 16 for indicating the various positions around the circle 16. The depending pin 24 of the arm 26 is removable from the plate 12 to permit positioning of a disc template such as the template 30 illustrated in Figure 2 or the template 32 illustrated in Figure 3 within the circle 16 after which the depending pin retains the design in position. Suitable securing tacks may be utilized for securing the design in correct rotational relation to the circle 16. For instance, the template 30 may be positioned therein with the 60 minute designation in the template 30 aligned with the 60 minute designation on the plate 12 and the template secured in position. The various circles forming the design template 30 may be easily constructed by utilization of a string 31 or other member attached to and extending longitudinally from the indicating arm 26 which may be swung about the longitudinal axis of pin 24. The various points where the star touches the outer circle may be provided with a mark by using a straight-edge or by using the flexible string wherein when the string passes over the 10-minute line on the circle 16, the string may be positioned on its surface and a mark made wherein the marks may be interconnected by any suitable straight-edge or a string for forming the star in the design of Figure 2. In Figure 3, the same procedure may be followed wherein the various points designated on the template 32 may be marked by the use of a suitable marking instrument after which the various arcs struck from the center defined by the marks may be laid out thereby providing an intricate design which is easily produced. If desired, the various indicia and graduation lines may be raised from or imprinted in the material of the plate 12, and the plate 12 may be constructed of any composition board, wood, paper or the like, which is easily and relatively inexpensive to construct.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An instrument for layout of geometrical designs comprising a flat sheet of material having a circle thereon, a scale graduated in degrees on said circle, indicia disposed exteriorly of the circle designating degrees of the circle, indicia disposed interiorly of the circle designating minutes of the clock, an indicating arm rotatably attached to said sheet of material at the center of said circle, a pin separably mounted on said sheet in the center of said circle and removably mounting said arm, said arm terminating in a pointed end on said circle for designating the position thereof, a template detachably mounted on said pin and within said circle by removing said arm and applying said template on said pin and then replacing said arm, said template having a design thereon, means for locating the template in angular relation to the circle, said template having points thereon for positioning said arm for forming points on an enlarged duplicate for the design on the template, and an extension string on said arm to transfer points from the template from which to form the enlarged duplicate.

References Cited in the file of this patent

UNITED STATES PATENTS 71,520     Lemley _____ Nov. 26, 1867

(Other references on following page)

UNITED STATES PATENTS

| | | |
|---|---|---|
| 97,672 | Michael | Dec. 7, 1869 |
| 661,483 | Barrie | Nov. 13, 1900 |
| 645,653 | White | Mar. 20, 1900 |
| 1,692,326 | Boggs | Nov. 20, 1928 |
| 1,706,342 | Bain | Mar. 19, 1929 |
| 2,085,059 | Woodside | June 29, 1937 |
| 2,141,696 | Rodd | Dec. 27, 1938 |
| 2,339,516 | Quillen | Jan. 18, 1944 |

FOREIGN PATENTS

| | | |
|---|---|---|
| 504,651 | Great Britain | Apr. 28, 1939 |
| 484,811 | Great Britain | July 15, 1952 |